Oct. 8, 1935.  K. L. HERRMANN  2,016,924
ANTIFRICTION BEARING
Filed June 28, 1934

INVENTOR.
Karl L. Herrmann
BY
ATTORNEY.

Patented Oct. 8, 1935

2,016,924

UNITED STATES PATENT OFFICE 2,016,924

ANTIFRICTION BEARING

Karl L. Herrmann, South Bend, Ind.

Application June 28, 1934, Serial No. 732,890

3 Claims. (Cl. 308—212)

This invention relates to anti-friction bearings and particularly to the "full roller" type of bearing, the principal object being to provide retainers for the ends of the rollers formed to cooperate with a ring to provide the outer race member for the rollers.

Another object is to provide in a bearing of the full roller type, a resilient split outer race member and end flanges therefor to maintain the outer race member in true cylindrical form and to prevent displacement of the rollers relative to the outer race member.

Another object is to provide in a bearing of the full roller type, a split ring forming an outer race member and flange members secured to the split ring, the flanges being formed to provide retaining means for maintaining the rollers in assembled position when the inner race member is removed.

Another object is to provide a method of forming and assembling roller retainers in which a split ring forming one of the race members for the bearing has attached thereto at its ends, a pair of flanges or rings for maintaining the outer race member in true cylindrical form, the flanges being formed to project beneath the tapered or rounded ends of the rollers to prevent accidental displacement of the rollers from the bearing.

Other objects, and objects relating to details of construction and methods of manufacture, will be apparent from the detailed description to follow.

In the drawing in which like numerals refer to like parts throughout the several views, Fig. 1 is a longitudinal sectional view showing one form of my invention, certain of the parts being in full lines to better illustrate the construction.

Figure 1:
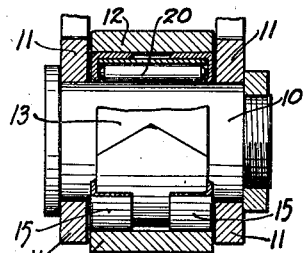
Figure 2:
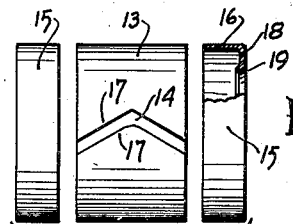
Fig. 2 is a side elevational view of the outer race member and the retainers for the ends of the rollers shown in separated relation.

Referring particularly to Figs. 1 and 2, I have shown an inner race member 10 which may be a shaft, or any suitable member, and have diagrammatically illustrated supports 11 therefor which, if desired, may be spaced to prevent movement of the bearing presently to be described longitudinally on the inner race member 10. I have shown a member 12 encircling the bearing which may be a support for the bearing and inner race member, if desired. As illustrated, the outer race member comprises a split ring 13 which normally is expanded to leave the gap or space 14 between the adjacent ends 17 of the ring. Two cup-shaped members 15 which may be identical in construction and shape are placed over the opposite side faces of the outer race member 13, the inner diameters of the flanges 16 on the cup-shaped members 15 being of a size whereby the outer race member 13 will be compressed so that the ends 17 thereof will abut against each other, as shown in Fig. 1, to thereby provide a continuous uninterrupted race member. If desired, the cup-shaped members 15 may be welded to the outer race member 13 and also the ends 17 of the ring may be welded and ground to prevent spreading and to provide a continuous member. The flanges 18 of the cup-shaped member 15 are preferably bent inwardly at 19 to extend beneath the rounded or tapered ends of the rollers 20 to thereby prevent the rollers from dropping out of the retainer after they have been assembled in the bearing.

The cup-shaped members 15 are preferably formed of rather light gauge material so that the flanges 18 thereof will spring sufficiently to permit the rollers 20 to be snapped into position in the bearing after which they will not readily come out due to the inturned ends 19, as illustrated. I have thus provided a bearing in which the outer race member 13, the roller retainer members 15 and the rollers 20 may be assembled and handled as a unit without the rollers becoming displaced while the assembly is removed from the inner race member.

Figure 3:
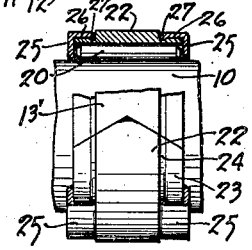
Fig. 3 is a view similar to Fig. 1, showing another form of my invention.
Figure 4:
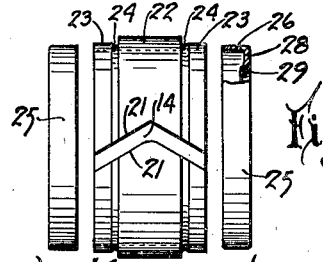
Fig. 4 is a view similar to Fig. 2, showing the outer race member and roller retainers illustrated in Fig. 3.

In Figs. 3 and 4 I have shown a slightly different form of construction in which the outer race member 13' is split to normally provide a space 14 between the ends 21 of the ring, as shown in Fig. 4, the outer race member 13' having a central portion 22 and reduced side portions 23 provided with grooves 24 therein adjacent to the central part 22. The cup-shaped retainers 25 are similar to the retainers 15, shown in Figs. 1 and 2, and are formed so that when the flange 26 thereof are inserted over the respective side portions 23 of the outer race member, the outer race member will be compressed so that the ends 21 thereof will abut against each other, as shown in Fig. 3. The inner edges of the cup-shaped members may then be beaded over at 27 into the grooves 24 to thus maintain the outer race member 13' and the cup-shaped retainers 25 in assembled relationship.

As in the previously described construction, the outer race member 13' and the cup-shaped members 25 may be welded together, if desired, and also the split ends of the outer race member 13' may also be welded where that added operation is deemed desirable. The flanges 28 of the cup-shaped members 25 have inturned edges 29 which fit under the tapered or rounded ends of the rollers 20 to maintain the latter in assembled relationship in the same manner as in the previously described construction.

In Fig. 3 I have indicated diagrammatically the inner race member 10 which may take the form of a shaft, as shown in Fig. 1, or such other construction as may be desired. Also in this form of my invention, the outer race member 13, the roller retainers 25 and the rollers 20 may be assembled and handled as a unit without the rollers becoming displaced while the assembly is separated from the inner race member.

Figure 5:
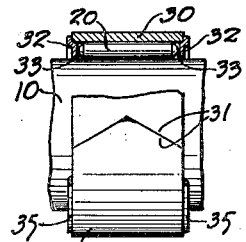
Fig. 5 is a view similar to Fig. 1, showing another form of my invention.
Figures 6, 6A, 6B:
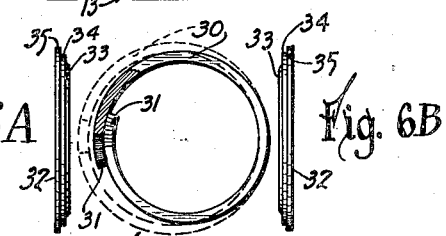
Figs. 6, 6A and 6B are views showing respectively the outer race member and the roller retainers illustrated in Fig. 5, in end elevation.

In Figs. 5 and 6 is illustrated a construction in which the outer race member 30 is normally compressed (see Fig. 6) so that the ends 31 thereof overlap each other. The retainers for the ends of the rollers 20 each comprise a ring 32 having the inner edges thereof bent inwardly at 33 to fit under the tapered or rounded ends of the rollers in the same manner as previously described, the rings 32 preferably being offset at 34 to provide flanges 35. In assembling this bearing, the outer race member 30 is expanded until the rings 32 are inserted into the sides thereof with the flanges 35 abutting against the edges of the outer race member, as clearly shown in Fig. 5. When assembled, the ends 31 of the split outer race member 30 will abut against each other as in the previously described construction and the ends may be welded together, if desired. In this construction the outer race member 30 is expanded to provide a cylindrical outer race member, whereas in the previously described construction, the outer race member is contracted when assembled for use. The rollers 20 are inserted in the same manner as previously described and are maintained in assembled relationship in the bearing as the inturned edges 33 of the ring 32 will prevent the rollers from dropping out of the bearing before the same is assembled over the inner race member.

Figure 7:
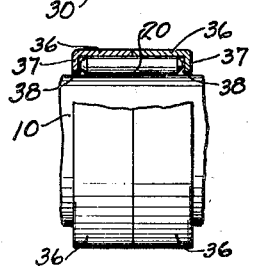
Fig. 7 is a view similar to Fig. 1, showing another modification of my invention.
Figure 8:
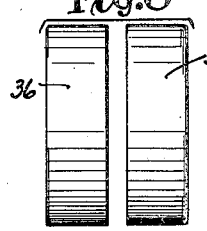
Fig. 8 is a side elevational view of the outer race members shown in Fig. 7.

In Figs. 7 and 8, I have omitted the split outer ring and have provided two cup-shaped members 36 each having inwardly directed flanges 37 pressed inwardly at 38 to retain the rollers in assembled position in the same manner as previously described. The abutting faces of the cup-shaped members 36 may be welded together, if desired, to thus form a unitary structure which is suitable for certain types of use wherein it is desired to use a cheaper construction than that shown in the previous views.

Figure 9:
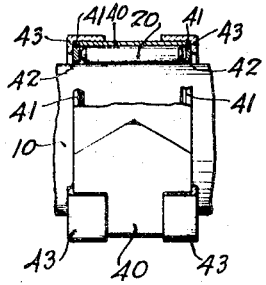
Fig. 9 is a view similar to Fig. 1, showing still another form of my invention.
Figure 10:
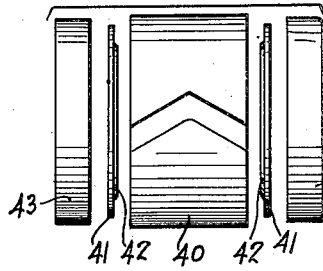
Fig. 10 is a view similar to Fig. 2, showing the several parts in separated position.

In Figs. 9 and 10, I have shown a split outer race member 40 like that shown in Figs. 1 and 2 against the end of which are mounted a pair of rings 41 having their inner edges pressed inwardly at 42 to fit under the rounded or tapered ends of the rollers 20 in the same manner as previously described, there being a pair of cup-shaped members 43 inserted over the rings 41 and the outer race member 40 for maintaining the respective parts in assembled position and welded together, if desired, it being apparent that the edge faces of the split ring 40 abut against each other and that they may also be welded, if desired. The outer race member 40, as shown in Figs. 9 and 10, is contracted from its normal expanded condition, shown in Fig. 10, in the same manner that the outer race member, shown in Figs. 1 to 4 inclusive, is contracted to provide a continuous ring or cylinder.

In the several views, I have shown the ring which comprises the outer race member, as being split in V-form which is desirable in that the rollers contact with both parts of the ring as they rotate relative thereto. It will be evident, however, that the ring may be split in any desired fashion as, for example, in a line obliquely to the side edges thereof, or to form a tongue and groove, as my invention is not to be limited to the V-form shown.

Throughout the several views I have shown a construction adaptable for an outer race member and retainers for the bearings, it being, of course, understood that the parts may be reversed to provide an inner race member without departing from the spirit and substance of my invention.

While I have shown several embodiments of my invention, it is to be understood that formal changes and changes relating to details of construction and methods of manufacture may be resorted to without departing from the spirit and substance of my invention, the scope of which is commensurate with the appended claims.

What I claim is:

1. An anti-friction bearing comprising, an inner race member, an outer race member comprising, a split ring normally non-cylindrical in form and means engaging the side faces of said ring to compress the same into cylindrical form, rollers interposed between said race members, and means on said first means to maintain said rollers in assembled position.

2. An anti-fricton bearing comprising, an inner race member, a split ring having a central portion and side portions having thinner walls than the central portion, said ring being normally non-cylindrical in form, cup-shaped members each having a portion thereof encircling said side portions of said ring and compressing the same into cylindrical form to provide an outer race member, and rollers interposed between said race members and between said cup-shaped members.

3. An anti-friction bearing comprising, an inner race member, a split ring normally non-cylindrical in form, means at the opposed sides of said ring to spring the same into cylindrical form to provide an outer race member, means to secure said first means and ring together, rollers interposed between said race members, and means to maintain said rollers in assembled position.

KARL L. HERRMANN.